United States Patent Office 3,098,844
Patented July 23, 1963

3,098,844
POLYMERIZATION OF HALOGEN-SUBSTITUTED OLEFINS WITH NOVEL CATALYSTS
Arthur T. Polishuk, Media, Pa., assignor to Sun Oil Company, Philadelphia, Pa., a corporation of New Jersey
No Drawing. Filed Nov. 29, 1957, Ser. No. 699,461
23 Claims. (Cl. 260—92.1)

This invention relates to the preparation of polymers of halogen-substituted olefins, and more particularly to the polymerization of halogen-substituted alpha-olefins having 3 to 8 carbon atoms.

Heretofore many polymers and copolymers of halogen-substituted olefins have been prepared. Some of these polymers, such as those of vinyl chloride, vinylidine chloride, and tetrafluoroethylene, are solid plastic materials which have many industrial and commercial applications. Catalysts such as peroxides, 2,2'-azodiisobutyronitrile, and potassium persulfate are usually used to polymerize these materials. These catalysts, however, have not been successfully used to prepare solid, high molecular weight polymers of halogen-substituted olefins having 3 or more carbon atoms. Heretofore only relatively low molecular weight amorphous solids, or thick liquids, have resulted from the polymerization of these monomers.

Many polymers and copolymers of olefins have also been prepared. Among the polymers heretofore prepared are predominantly crystalline, relatively high molecular weight solids, which may be prepared through the use of a material such as titanium trichloride, activated by an aluminum trialkyl, such as aluminum triethyl. Such polymers have many applications, such as for molding, extruding, or otherwise fabricating into pipe, containers, and other useful articles. These polymers, however, have the disadvantage of being relatively easily oxidized, so that it is usually necessary to add an antioxidant, or inhibitor, to the polymer. The addition of an inhibitor is expensive, not only because of the cost of the material, but also because an additional step in preparing the polymer is required. In addition, the inhibitors used usually impart a color to the polymer, which in itself is often objectionable.

The tendency of these polymers to be attacked by oxidation or otherwise is believed due to the presence of highly active hydrogen atoms in the polymer. These hydrogen atoms are primarily tertiary hydrogen atoms, i.e., hydrogen atoms attached to tertiary carbon atoms.

It therefore is an object of this invention to provide a method for preparing relatively high molecular weight, predominantly crystalline polymers which are relatively inert to oxidation. It is another object to provide a method for preparing such polymers which have a reduced number of tertiary hydrogen atoms. Still another object is to provide a method for preparing relatively high molecular weight solid polymers of the halogen-substituted olefins having 3 or more carbon atoms. Other objects and their achievement in accordance with this invention will become apparent hereinafter.

According to the process of this invention, halogen-substituted olefins having from 3 to 8 carbon atoms are polymerized to relatively high molecular weight, predominantly crystalline solid polymers by contacting the monomer with a metal halide catalyst and an activator for the catalyst. By "crystalline polymer" as used herein is meant polymer which exhibits a crystalline structure by X-ray analysis. It is presumed that such structure, at least in part, is the result of long chain molecules in which the pendent groups exhibit a regularity of position over long portions of the molecule. Normally such crystallinity is demonstrated by the relative insolubility of the polymer in the usual solvents, such as the saturated hydrocarbons, cycloparaffins, and aromatics. Such a crystalline polymer is also less reactive than amorphous polymer, and has a higher melting point and higher strength.

The monomers which may be polymerized by this process are the halogen-substituted alpha-olefins having from 3 to 8 carbon atoms. As used herein, "alpha-olefins" refers to olefins having a terminal double bond, and "halogen-substituted alpha-olefins" refers to alpha-olefins wherein one or more hydrogen atoms have been replaced by halogen atoms, including fluorine, chlorine, bromine and iodine.

The preferred halogen-substituted alpha-olefins are those having halogen atoms attached to carbon atoms which are tertiary in a polymer of the material, such as the beta unsaturated carbon atom. For example, in 2-fluoropropene ($CH_2=CF-CH_2$) the beta unsaturated carbon becomes a tertiary carbon after polymerization. Branched monomers can be used, but it is preferred that such monomers have no hydrogen atoms attached to the tertiary carbon atoms. For example, 3-methyl-2,3-dichlorobutene-1 can be used with good results, since in the polymer product all tertiary carbon atoms are attached to chlorine atoms. The preferred monomer is accordingly one which has no hydrogen atoms which would be attached to a tertiary carbon in a polymer of the material. However, other halogen-substituted alpha-olefins may be used in the process of this invention with good results, although some of the polymers produced are less resistant to oxidation than those which have no tertiary hydrogen atoms. Suitable monomers for the process of this invention include allyl chloride, allyl fluoride, allyl bromide, allyl iodide, 1,2,3-trifluoropropene, 2-chlorobutadiene-1,3, 2-bromohexene-1, 2,3-dibromopropene, 2,3-dichloropropene, 2-fluorobutene-1, 3-bromo-3,3-difluoropropene, and 2-bromo-1,1-difluoropropene.

The catalysts suitable for the process of this invention are subhalides of metals of groups IV, V and VI of the periodic table. By "subhalide" as used herein is meant the halide of a metal which is in a valence state other than its highest valence state. The subhalides of titanium and zirconium, such as titanium trichloride, titanium difluoride, zirconium tribromide, and zirconium diiodide are the preferred catalysts, however the subhalides of other metals of groups IV, V and VI are also effective catalysts. For example, the subhalides of hafnium, vanadium, niobium, chromium, molybdenum and tungsten may be used. Among the suitable catalysts are included chromous iodide, tungsten dibromide, vanadium trifluoride, and molybdenum trichloride.

The catalysts used in this process must be activated by a suitable activator, such as an aluminum trialkyl. The aluminum trialkyls, such as aluminum triethyl, and aluminum triisobutyl are the preferred activators, however other metal alkyls, such as the magnesium and zinc alkyls, having up to about 12 carbon atoms in the alkyl groups can be used with good results. In addition, satisfactory activators include metal hydrides, metal borohydrides, and alkyl metal halides. Metal hydrides which can be used include, for example, lithium hydride, lithium aluminum hydride, and sodium hydride. Metal borohydrides such as sodium borohydride and potassium borohydride illustrate the borohydrides which can be used. Alkyl metal halides which can be used include the Grignard reagents, such as methylmagnesium bromide, ethylmagnesium chloride, phenylmagnesium bromide, and the like, and other alkyl metal halides such as diethyl aluminum chloride and ethyl aluminum dichloride.

The catalyst and the activator are contacted with the monomer to be polymerized in an inert, liquid reaction medium. Saturated hydrocarbons such as the hexanes, heptanes, octanes, nonanes, decanes, cyclopentanes, cyclohexanes, decahydronaphthalene and mixtures thereof and the like which are liquid under the conditions of reaction are preferred materials to use as the reaction medium. The polymerization reaction must take place under anhydrous and oxygen-free conditions, since the catalyst is deactivated by water and oxygen. Suitable polymerizing conditions include room temperature and atmospheric pressure, although temperatures of about 0° C. to about 250° C., and pressures up to 10,000 p.s.i.g. (pounds per square inch gauge) or more may be used. It is necessary that the reaction medium be maintained in the liquid phase.

In the preferred embodiment of this process, a reactor fitted with a stirrer is partially filled with the inert reaction medium, and the monomer to be polymerized is injected therein. The activator is then added to the reaction medium, and the catalyst is dispersed therein in the form of finely divided solid particles. The constituents may be combined in any order, it only being necessary that the monomer, catalyst, and activator contact each other in liquid phase. The proportion of catalyst to activator can be varied considerably and good results obtained. Normally a mole ratio of catalyst to activator of from about 1:12 to 10:1 is used. The amount of reaction medium may vary from 100 to 5,000 times the weight of catalyst used. Polymerization begins almost immediately when the monomer, catalyst, and activator are combined, and may continue for from 1 to 20 hours, depending on the particular proportions of the components. Additional monomer may be added from time to time to insure that an excess is available for polymerization.

When polymerization is complete, or when it is desired to stop the reaction, the reaction medium is drained off, and the remaining solid polymer is flooded with a deactivator for the catalyst, which may be water or alcohol. The polymer is preferably comminuted in the presence of the catalyst deactivator in order to expose catalyst particles which have been coated by the polymer. The polymer is then washed with an aqueous or alcoholic solution of an inorganic acid, such as nitric acid, to remove the deactivated catalyst, leaving a white solid polymer.

Although the process of this invention has been discussed hereinbefore primarily in terms of a "batch" operation, it is equally adaptable to continuous operation. For example, the monomer, catalyst and activator may be continuously added to the reaction mixture, and solid polymer continuously removed as it is formed.

Polymers prepared by this process are predominantly crystalline solids having a molecular weight of above 10,000, and usually of from about 25,000 to about 500,000. These polymers are extremely inert materials having excellent chemical and oxidation resistance, and are easily molded or otherwise formed into many useful articles, such as pipe and various containers.

The following specific embodiment, wherein "parts" refers to parts by weight, illustrates the process of this invention:

A reactor fitted with a stirrer is partially filled with 1,000 parts of a mixture of saturated hydrocarbons, mostly octanes, in an atmosphere of nitrogen. With the temperature of this reaction medium maintained at 80° C., about 250 parts of 2-fluoropropene are injected therein at a pressure of 250 p.s.i.g. One part of aluminum triethyl and 1.6 parts of titanium trifluoride are then added, whereupon polymerization starts immediately, as evidenced by a drop in the pressure in the reactor. Additional 2-fluoropropene is added from time to time to maintain the pressure in the reactor at approximately 250 p.s.i.g., and the temperature is maintained at about 80° C. After 5.0 hours, reaction has virtually stopped, due to the coating of the catalyst particles by solid polymer. The reaction medium is then drained off and the solid polymer transferred to a ball mill, where 1,000 parts of methanol are added. The ball mill is started and run for one hour. The methanol is then removed by filtration, and the polymer washed with dilute nitric acid. The polymer is then washed with water and dried. About 175 parts of white crystalline polymer are obtained, having an average molecular weight of about 210,000. This polymer may be formed into useful articles by the usual methods, as by molding or extruding.

Similarly, the polymerization by this process of other halogen-substituted olefins, within the limits defined herein, results in the formation of relatively high molecular weight solid polymers which may be formed into useful articles.

The invention claimed is:

1. A process for preparing solid homopolymers of a halogen-substituted olefin, which comprises contacting, at a temperature of from 0 to 250° C., and a pressure of from atmospheric to 10,000 p.s.i.g., a halogen-substituted monoenic alpha-olefin having from 3 to 8 carbon atoms with a dispersion in an inert reaction medium of solid particles of a halide of a metal selected from the group consisting of titanium, zirconium, hafnium, vanadium, niobium, chromium, molybdenum, and tungsten wherein said metal is at a valance state below its highest valance state, and an activator therefor selected from the group consisting of aluminum alkyls, magnesium alkyls, zinc alkyls, alkali metal hydrides, alkali metal aluminum hydrides, alkali metal borohydrides, alkyl aluminum halides, alkyl magnesium halides and phenyl magnesium halides, and recovering solid homopolymers of halogen-substituted alpha-olefins therefrom.

2. A process as defined by claim 1 wherein the metal halide is a halide of titanium.

3. A process as defined by claim 1 wherein the metal subhalide is titanium trifluoride.

4. A process as defined by claim 1 wherein the metal subhalide is titanium trichloride.

5. A process as defined by claim 1 wherein the activator is an aluminum trialkyl.

6. A process as defined by claim 1 wherein the activator is aluminum triethyl.

7. A process as defined by claim 1 wherein the halogen-substituted alpha-olefin has a halogen atom attached to the beta unsaturated carbon atom.

8. A process as defined by claim 1 wherein the halogen-substituted alpha-olefin is 2-fluoropropene.

9. A process as defined by claim 1 wherein the halogen-substitute alpha-olefin is 1,2,3-trifluoropropene.

10. A process as defined by claim 1 wherein the halogen-substituted alpha-olefin is 2,3-dichloropropene.

11. A process as defined by claim 1 wherein the halogen-substituted alpha-olefin is 2-fluorobutene-1.

12. A process for preparing solid homopolymers which comprises contacting an olefin having the general formula:

$$Y_1-\underset{Y_2}{\overset{Y}{C}}-\left[\underset{Y_1}{\overset{Y}{C}}\right]_n-\underset{}{\overset{X}{C}}=C\underset{Y_1}{\overset{Y}{{}}}$$

wherein X is a halogen group; Y, $Y_1$, and $Y_2$ are each selected from the group consisting of hydrogen and a halogen group and $n$ is an integer of from 0 to 5, at a temperature of from 0 to 250° C. and a pressure of from atmospheric to 10,000 p.s.i.g., with a dispersion in an inert reaction medium of solid particles of a halide of a metal selected from the group consisting of titanium, zirconium, hafnium, vanadium, niobium, chromium, molybdenum, and tungsten wherein said metal is at a valance state below its highest valance state, and an activator therefor selected from the group consisting of aluminum alkyls, magnesium alkyls, zinc alkyls, alkali metal hydrides, alkali metal aluminum hydrides, alkali metal borohydrides, alkyl aluminum halides, alkyl magnesium halides and phenyl magnesium halides, and recovering solid homopolymers of said olefin therefrom.

13. The process of claim 12, wherein said metal halide is titanium trifluoride.

14. The process of claim 12, wherein said metal halide is titanium trichloride.

15. The process of claim 12, wherein said activator is aluminum triethyl.

16. The process of claim 12, wherein said olefin is 2-fluoropropene.

17. The process of claim 16, wherein said metal halide is a titanium trihalide and said activator is an aluminum alkyl.

18. The process of claim 12, wherein said olefin is 1,2,3-trifluoropropene.

19. The process of claim 18, wherein said metal halide is a titanium trihalide and said activator is an aluminum alkyl.

20. The process of claim 12, wherein said olefin is 2,3-difluoropropene.

21. The process of claim 20, wherein said metal halide is a titanium trihalide and said activator is an aluminum alkyl.

22. The process of claim 12, wherein said olefin is 2-fluorobutene-1.

23. The process of claim 22, wherein said metal halide is a titanium trihalide and said activator is an aluminum alkyl.

References Cited in the file of this patent

UNITED STATES PATENTS

| | | |
|---|---|---|
| 2,484,530 | Schroeder | Oct. 11, 1949 |
| 2,585,529 | Austin | Feb. 12, 1952 |
| 2,683,140 | Howard | July 6, 1954 |
| 2,824,089 | Peter et al. | Feb. 18, 1958 |
| 2,827,447 | Nowlin | Mar. 18, 1958 |
| 2,840,551 | Field et al. | June 24, 1958 |
| 2,856,435 | Lo | Oct. 14, 1958 |
| 2,880,199 | Jezl | Mar. 31, 1958 |
| 2,881,156 | Pilar et al. | Apr. 7, 1959 |
| 2,882,264 | Barnes et al. | Apr. 14, 1959 |

FOREIGN PATENTS

| | | |
|---|---|---|
| 533,362 | Ziegler | May 16, 1955 |